United States Patent
Sakamaki et al.

(10) Patent No.: US 6,217,033 B1
(45) Date of Patent: Apr. 17, 2001

(54) CHUCK DEVICE

(75) Inventors: Kazuo Sakamaki; Akira Sakamaki; Choukichi Sato, all of Ojiya (JP)

(73) Assignee: Yokiwa Seiko Kabushiki Kaisha, Niigata-Ken (JP)

( * ) Notice: Subject to any disclaimer, the term of this patent is extended or adjusted under 35 U.S.C. 154(b) by 0 days.

(21) Appl. No.: 09/371,895

(22) Filed: Aug. 11, 1999

(30) Foreign Application Priority Data

Aug. 13, 1998 (JP) .................................................. 10-228839

(51) Int. Cl.[7] ...................................................... B23B 31/12
(52) U.S. Cl. .............................. 279/62; 279/140; 279/902
(58) Field of Search ................................ 279/60–65, 140, 279/902

(56) References Cited

U.S. PATENT DOCUMENTS

| | | | |
|---|---|---|---|
| 5,145,194 | 9/1992 | Huff et al. | 279/62 |
| 5,503,409 | 4/1996 | Röhm | 279/62 |
| 5,984,320 | * 11/1999 | Nakamura | 279/62 |

FOREIGN PATENT DOCUMENTS

| | | |
|---|---|---|
| 0 667 201 B1 | 8/1995 | (EP) . |
| 7-214407 | 8/1995 | (JP) . |

* cited by examiner

*Primary Examiner*—Steven C. Bishop
(74) *Attorney, Agent, or Firm*—Sughrue, Mion, Zinn, Macpeak & Seas, PLLC

(57) ABSTRACT

A chuck device provided with a loosening prevention mechanism, in which claws threadedly engaged with a rotary nut are moved back and force to be opened and closed by the rotation of the rotary nut provided on a body so that a tool is clamped by the claws. A receiving portion is provided to face a rear surface of the rotary nut, rolling members are provided between the receiving portion and the rotary nut, the rear surface of the rotary nut and/or a front surface of the receiving portion is formed to be slanted surfaces expanding to the outside, and surfaces on which the rolling members are moved outwardly to contact when the tool is clamped by the claws and a fastening reactive force in a thrust direction is applied to the rolling members are formed into a movement suppressing surface for suppressing movement of the contacted rolling members.

9 Claims, 5 Drawing Sheets

CHUCK DEVICE

BACKGROUND OF THE INVENTION

There are many kinds of power rotary tools such as an electric power drill, a battery drill, a hammer drill, a vibratory drill, an electric power driver or the like.

The electric power drill and the battery drill are used to perform boring work for iron plate or the like and boring work for woody material.

Also, the hammer drill and the vibratory drill are used to perform boring work while imparting vibrations to stone material or the like by a built-in vibration generating mechanism or the like. The electric power driver is used to perform screwing work for a board or the like by a built-in clutch.

The present invention relates to a chuck device for gripping a tool, used for mounting a tool (such as a drill bit and a driver bit) for rendering the tool to perform the above-described various works.

In a chuck device having a structure for gripping a tool only by a manual operation without any tool, in order to generate a large tool gripping force with a small torque (torque obtained by manual rotation), and in order to keep a smooth rotation of a rotary nut engaged with claws even if a fastening reactive force in a thrust direction is applied to the rotary nut, balls (steel balls) are interposed between a back surface of the rotary nut and a flange extending from a chuck body.

In such a chuck device having the structure for gripping the tool only by the manual operation without any tool, since the balls are arranged for the above-described reason, the rotary nut is smoothly rotated but this means that the screwed and fastened rotary nut is likely to be loosened.

Therefore, so far, there has been proposed a chuck device having a structure provided with a means for preventing the loosening of the rotary nut, in particular, a chuck device for preventing the grip of the tool is prevented from being loosened due to the vibrations or the like when the work is carried out by using an electric rotary power tool incorporating the vibration generation mechanism, an electric rotary power tool incorporating a shock generating mechanism or an electric rotary power tool incorporating a clutch mechanism.

In, for example, U.S. Pat. No. 5,145,194 (hereinafter referred to as a prior art example), recess portions are provided in the rolling surface per se of the balls, a resistance is imparted to exhibit the loosening preventing effect by the resistance when the balls that are present in the recess portions are disengaged from the recess portion while rotating (orbiting while rotating about their own axes).

However, in the prior art, the recess portions are formed in the rolling surface, when the fastening reactive force is applied in the thrust direction to the balls, the balls are not rotated smoothly. This means that it is impossible to obtain a large tool gripping force for the chuck device for holding the tool only by the manual operation without using any tool and would become fatal (To prevent the loosening while sacrificing the maintenance of the large tool gripping force is completely opposed to the inherent purpose.) In the case where the balls are present on a border between the recess portions and the flat surfaces therearound, i.e., at the ridge positions, the fastening reactive force is applied in the thrust direction without any change so that a large surface pressure is applied to the ridge line, resulting in deformation of the ridge line. This damages the ridge lines of the recess portions due to the repeated use, resulting in the degradation of the loosening prevention effect.

SUMMARY OF THE INVENTION

In order to overcome the above-noted defects, an object of the present invention is to provide a chuck device that may prevent the loosening of the grip of a tool while exhibiting a large tool gripping force.

The essence of the present invention will now be described with reference numerals.

A chuck device in which claws threadedly engaged with a rotary nut are moved back and forth to be opened and closed by rotation of the rotary nut provided on a body, and a tool is clamped by the claws, is characterized in that a receiving portion is provided to face a rear surface of the rotary nut, rolling members are provided between the receiving portion and the rotary nut, the rear surface of the rotary nut and/or a front surface of the receiving portion is formed to be slanted surfaces expanding to the outside, and surfaces on which the rolling members are moved outwardly to contact when the tool is clamped by the claws and a fastening reactive force in a thrust direction is applied to the rolling members are formed into a movement suppressing surface for suppressing movement of the contacted rolling members.

Also, a chuck device in which a rotary sleeve provided on a body is rotated, claws threadedly engaged with a rotary nut are moved back and force to be opened and closed by the rotation of the rotary nut rotating together with the rotary sleeve and a tool is clamped by the claws, is characterized in that a receiving portion is provided to face a rear surface of the rotary nut, rolling members are provided between the receiving portion and the rotary nut, the rear surface of the rotary nut and/or a front surface of the receiving portion is formed to be slanted surfaces expanding to the outside, and surfaces on which the rolling members are moved outwardly to contact when the tool is clamped by the claws and a fastening reactive force in a thrust direction is applied to the rolling members are formed into a movement suppressing surface for suppressing movement of the contacted rolling members.

The chuck device according to the first or second aspect, an elastic surface warped by the contact of the rolling member is used as the movement suppressing surface.

The chuck device according to the first or second aspect, at least one of recess portions and corrugated portions is used as the movement suppressing surface.

The chuck device according to the first or second aspect, one of a plurality of recess grooves and corrugations extending in a thrust direction of the rotary nut and provided in parallel in the radial direction are used as the movement suppressing surface.

The chuck device according to any one of the first to fifth aspects, the receiving portion having an elasticity is used as the receiving portion.

The chuck device according to any one of the first to sixth aspects, at least one of steel balls, ceramic balls and plastic balls are used as the rolling members.

Also, according to an eighth aspect of the invention, there is provided a chuck device in which claws threadedly engaged with a rotary nut are moved back and force to be opened and closed by the rotation of the rotary nut provided on a body and a tool is clamped by the claws, characterized in that, when the tool is clamped by the claws and a fastening reactive force in a thrust direction is applied to rolling members, the rolling members are moved outwardly from the rolling surface and brought into contact with movement suppressing surface for suppressing the movement of the rolling members formed at positions different from rolling surface, and when the fastening reactive force in the thrust direction is eliminated from this condition, the rolling members are returned back to the original portion.

The chuck device according to the eighth aspect, when the fastening reactive force in the thrust direction is applied to the rolling members by using a slant surface, the rolling members are brought into contact with the movement suppressing surface.

When the claws are brought into contact with the tool, the movement of the claws is stopped and the fastening reactive force in the thrust direction is applied to the rolling members, the rotary nut is finely moved rearwardly from the chuck by an amount of backlash by a lead angle of the screw. At this time, since the back surface of the rotary nut and/or the front surface of the receiving portion are formed into slant surfaces expanded to the outside, the rolling members are pressed outwardly by the radial component of the fastening reactive force. The rolling members are brought into contact with the movement suppressing surface. Accordingly, the movement (orbital rotation) of the rolling members is restricted. As a result, the rotation of the rotary nut is suppressed thereby and the loosening prevention effect is exhibited. Incidentally, the pressure force to the rolling members is released when the rotary nut is reversely rotated in the direction in which the rotary nut is loosened.

If the elastic surface that is warped by the contact of, for example, the rolling members is used as the movement suppressing surface, the movement of the rolling member is suppressed by the deformation. Otherwise, if, for example, the recess portions or the corrugated portions are used as the movement suppressing surface or the recess grooves extending in the thrust direction of the rotary nut, the movement of the rolling members is suppressed by the recess portions, the corrugated portions or the recess grooves.

With the structure of the invention as described above, it is possible to provide a chuck device that is superior in practical use to make it possible to prevent the loosening of the grip of the tool while maintaining the exhibition of the large tool grip.

DESCRIPTION OF THE PREFERRED EMBODIMENTS

Figure 6:
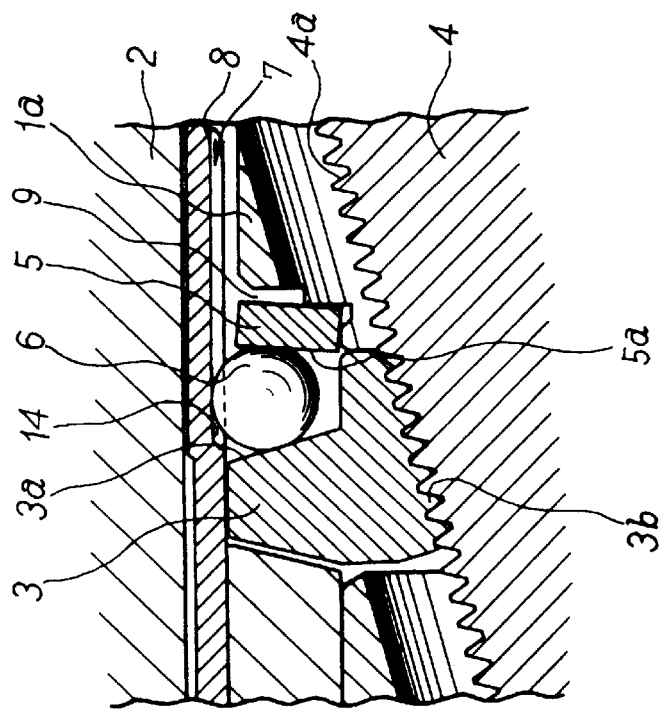
FIG. 6 is a view illustrating the movement of balls in accordance with the second embodiment.
Figure 5:
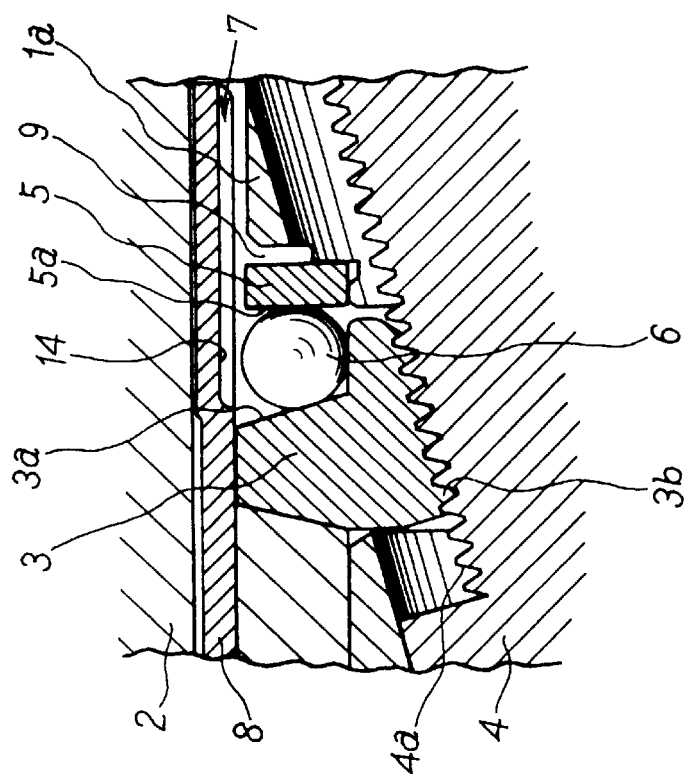
FIG. 5 is a view illustrating the movement of balls in accordance with a second embodiment of the invention.
Figure 7:
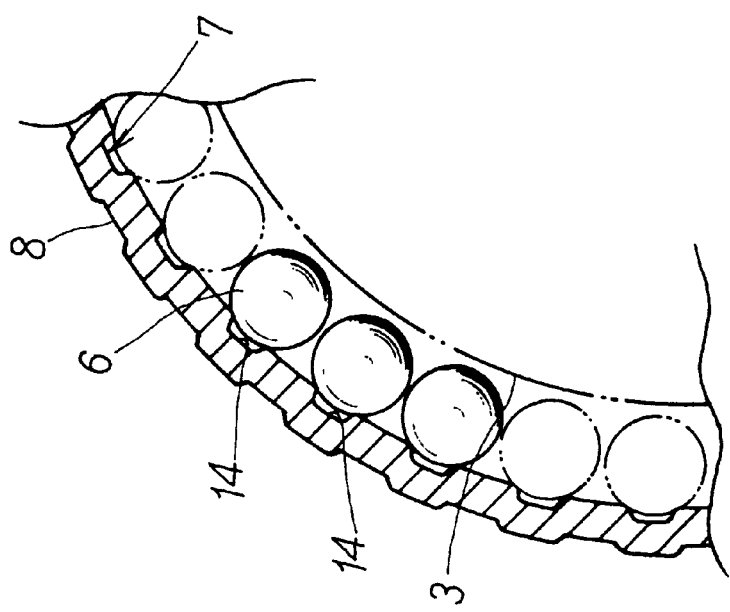
FIG. 7 is a cross-sectional view of a part of a primary part of the second embodiment.

FIGS. 1 to 4 show a first embodiment of the present invention and FIGS. 5 to 7 show a second embodiment of the present invention. The invention will now be described.

The first embodiment will now be described in detail. Three claws 4 having a tool gripping portion in their inner circumferential surfaces project to a tip end of a body 1 through a slant hole provided in the body 1 and are slanted to an axis of the body 1. Male screw portions 4a are formed on the outside of the three claws 4. A rotary nut 3 having a female screw portion 3b is fitted around the claws 4 under the condition that it threadedly engages with the male screw portions 4a.

A rotary sleeve 2 made of synthetic resin (may be made of metal material) is fitted around the body 1. A metallic annular member 8 is arranged within the rotary sleeve 2. A plurality of small holes as recess portions 7 are provided in an annular shape at a predetermined interval in the annular member 8. Incidentally, this annular member 8 may be formed integrally with the rotary sleeve 2 or may be formed integrally with the rotary nut 3. Furthermore, it is possible to integrally form the annular member 8, the rotary sleeve 2 and the rotary nut 3 with each other. Also, the annular member 8 may be formed integrally with a flange portion 1a of the body 1. A back surface 3a of the rotary nut 3 is formed into an outer conical surface. A receiving portion 5 is formed at the flange portion 1a of the body 1 and at a position facing the rotary nut 3. A plurality of balls (steel balls, ceramic balls, plastic balls) as rolling members 6 are provided between the back surface 3a of the rotary nut 3 and a front surface 5a of the receiving portion 5. Incidentally, the receiving portion 5 may be formed to extend the flange portion 1a of the body 1. Also, the conical slant surface is not provided on the back surface 3a of the rotary nut 3 but may be provided on the front surface 5a of the receiving portion 5. Alternatively, the conical slant surface may be formed both on the front surface 5a of the receiving portion 5 and the back surface 3a of the rotary nut 3.

The receiving portion 5 is made of elastic member so that the balls are moved forwardly when the claws 4 grip the tool and a fastening reactive force is applied thereto in a thrust direction. Reference numeral 9 denotes a clearance for allowing the receiving portion to be flexed.

Reference numeral 10 denotes a grip sleeve provided on the body 1 in a rotation preventing condition. Incidentally, it is possible to take a structure where the rotary sleeve 2 extends rearwardly to dispense with the grip sleeve 10. In this case, the electric rotary tool to be described later, in which a spindle is locked, is used. Reference numeral 11 denotes a stopper for the rotary sleeve 2.

Figure 1:
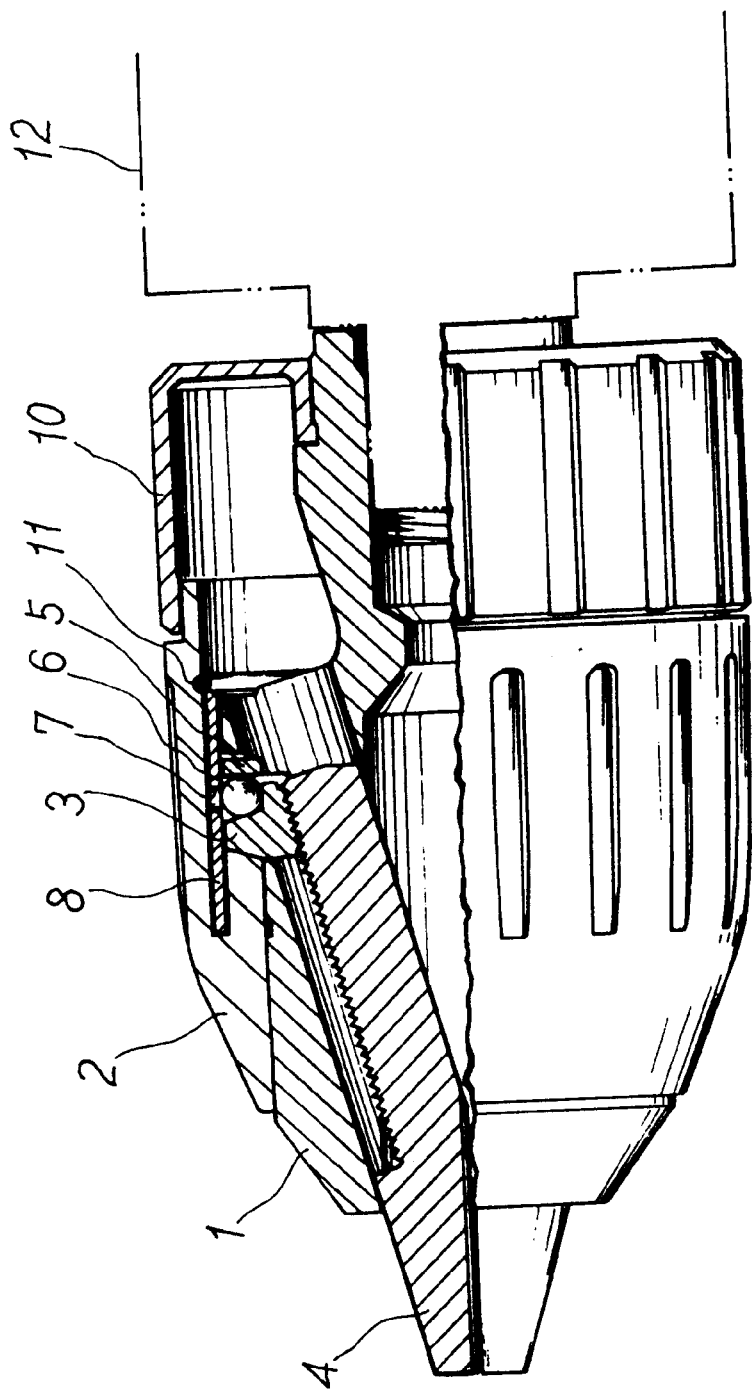
FIG. 1 is a cross-sectional view of a part of a first embodiment of the invention.
Figure 2:
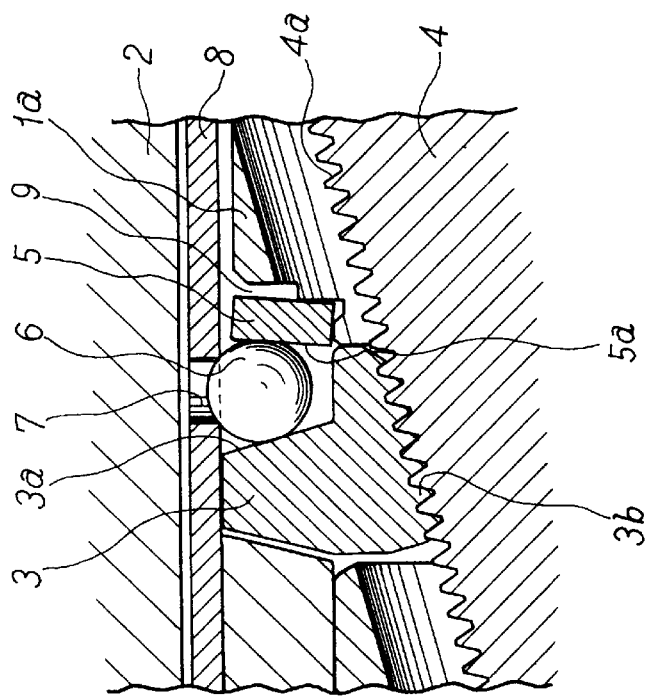
FIG. 2 is a view illustrating the movement of balls in accordance with the first embodiment.
Figure 3:
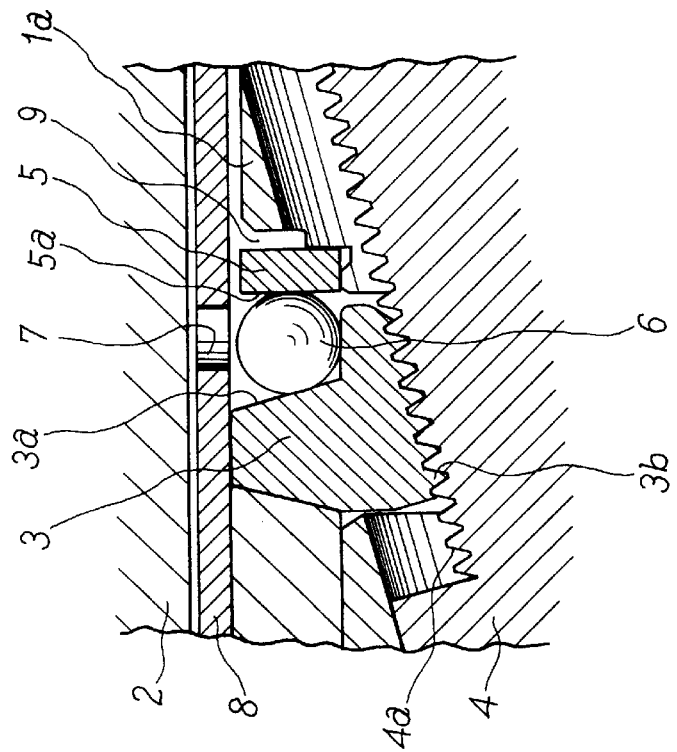
FIG. 3 is a view illustrating the movement of balls in accordance with the first embodiment.
Figure 4:
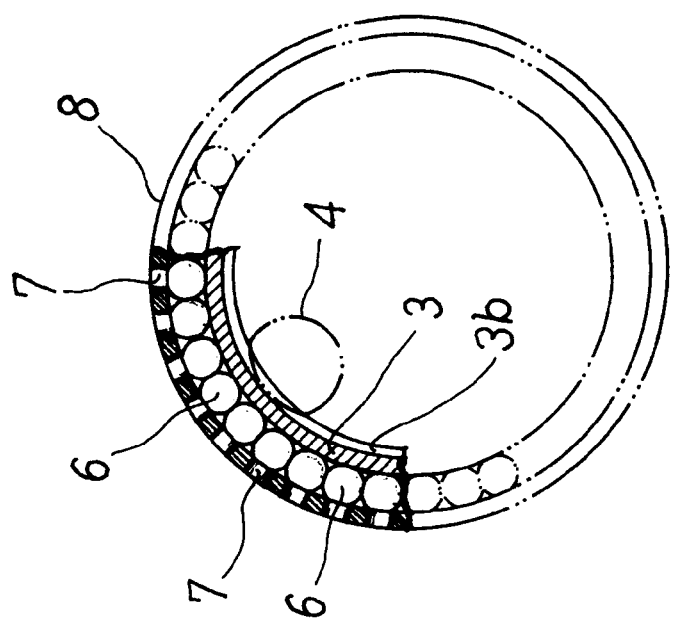
FIG. 4 is a cross-sectional view of a primary part of a first embodiment of the invention.

Also, the electric power rotary tool 12 shown in the FIG. 1 is of the type that the spindle is kept in a free condition during non-operation. It is of course possible to apply the present invention to an electric rotary tool where the spindle is locked during non-operation or an electric power rotary tool where an abrupt brake is effected when the rotating spindle is stopped.

Since the first embodiment has been constructed as described above, the tool is inserted between the three claws 4, the grip sleeve 10 is gripped by one hand in order to rotate the rotary nut 3, the rotary sleeve 2 is gripped and rotated by the other hand (in case of the above-described electric power rotary tool where the spindle is locked, it is unnecessary to grip the grip sleeve 10), and the claws 4 are moved forwardly to be closed to grip the tool.

At this time, the fastening reactive force in the thrust direction in accordance with the fastening of the tool is applied to the rotary nut 3. The rotary nut 3 is finely moved rearwardly by an amount of backlash of the screw portions 4a and 3a by a lead angle of the screw portions 4a and 3a. A radial component of the fastening reactive force in the thrust direction is applied to the balls which are orbited while rotating about their own axes by the rotation of the rotary nut 3. The balls are engaged within the small holes of the annular member 8 from a position shown in FIG. 2 to a position shown in FIG. 3. The worker may readily recognize, by a sound and his sense, whether or not the balls are engaged within the small holes because the balls are received into and released away from the small holes when he rotates the rotary sleeve 2.

When the power rotary driver is operated under this condition and a predetermined work is performed by the tool, even if, for example, vibrations and shocks are transmitted from the tool, since the balls are engaged within the small holes, the resistance occurs from the edges of the small holes upon the release away from the small holes. The orbital rotation of the balls is suppressed corresponding to this resistance. Accordingly, the rotary sleeve 2 and the rotary nut 3 are prevented from being loosened. Incidentally, when the rotary nut 3 is rotated in the direction that it is to be loosened, the radial component (pressure force) is eliminated.

In the first embodiment, since the recess portions or the like are not provided on the front surface 5a of the receiving portion 5 or the back surface 3a of the rotary nut 3 which are the ball rolling surfaces, it is possible to perform the smooth rotation of the rotary sleeve 2. Accordingly, it is possible to obtain a large tool fastening force. It is possible to maintain the good fastening force, i.e., the smooth rotation of the rotary sleeve 2 which is inevitable for the chuck device having the structure for gripping the tool only with the manual operation without any tool.

Also, in the case of the first embodiment, since the pressure force for engaging the balls with the small holes is not the entire fastening reactive force in the thrust direction but a part of the fastening reactive force, i.e., the radial component, the pressure force is weak corresponding to this. Even if the balls are located at the ridge line positions of the small holes, there is a little fear that the ridge lines would be damaged.

Also, in the first embodiment, by suitably selecting the slant angle of the back surface 3a of the rotary nut 3, it is possible to change the pressure force to the small holes for the balls. It is therefore possible to readily obtain the pressure force for the use.

Also, since the receiving portion 5 has an elasticity, the balls that have been fitted in the small holes are kept under that condition by the elastic force. Accordingly, it is possible to obtain a good loosening prevention effect. Of course, if the elasticity of the receiving portion 5 is too weak, the loosening prevention effect is suppressed, the elasticity of the receiving portion 5 should be set at a suitable elasticity.

Furthermore, when the balls that are present within the small holes ride over the small holes by their orbital rotation, the balls are moved inwardly (downwardly in FIG. 1). In this case, if the receiving portion 5 is not a member having the elasticity, the inward movement of the balls is prevented. However, in this embodiment, since the receiving member 5 is the elastic member, such a problem may be solved.

Incidentally, in the first embodiment, the small holes are formed in the annular member 8. However, recess portions or corrugated roughened surfaces may be used for the small holes. In this case, it is possible to directly provide the recess portions or the corrugated roughened surface on the inner surface of the rotary sleeve 2 without providing the annular member 8. If the rotary sleeve 2 is made of synthetic resin, it is possible to utilize its elasticity.

A second embodiment will now be described in detail.

Recess grooves 14 are provided in the inner surface of the annular member 8 arranged inside of the rotary sleeve 2. A plurality of recess grooves 14 are provided at a predetermined interval in the radial direction extending in the thrust direction of the rotary nut 3. FIG. 5 shows the state before fastening and FIG. 6 shows the state upon the fastening.

The other structure is the same as the first embodiment.

In the second embodiment, if an annular member is provided inside of the grip sleeve 10 on the rear side of the annular sleeve 8, with a plurality of projections which are engageable with the recess grooves 14 of the annular member 8 and which are extended in the thrust direction and juxtaposed at a predetermined interval in the radial direction being provided at the front of the annular member, and the loosening of the rotary nut 3 is prevented by the engagement with a projection and the corresponding recess groove 14 (this engagement of course allows the fastening rotation of the rotary nut 3), another fastening loosing function is performed in addition to the loosening preventing function by the above- described movement controlling surfaces (small holes or the like). Thus, the loosening of the rotary nut 3 may be prevented more positively corresponding to this.

Incidentally, in case of the structure where the rotary sleeve 2 extends rearwardly and the grip sleeve 10 is not present, the above-described annular member is provided in the rotation prevention condition together with the body 1 within the rotary sleeve 2.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A chuck device comprising:
   a body having a receiving portion;
   a rotary nut rotatably disposed on the body and defining a rear surface;
   claws threadedly engaged with the rotary nut for movement back and forth to be opened and closed by rotation of the rotary nut with respect to the body, the claws being operative to clamp a tool;
   a plurality of rolling members disposed between the receiving portion and the rotary nut, with at least one of the rear surface of the rotary nut and a front surface of the receiving portion being slanted so as to expand outwardly with respect to the chuck device; and
   an annular member disposed around said rolling members and having on an inner circumferential surface thereof a movement suppressing surface such that a pressure force for pushing the rolling members into contact with said movement suppressing surface is only a radial component of a fastening reactive force in a thrust direction which is applied to the rolling members when the tool is clamped by the claws, wherein said movement suppressing surface is immovable relative to the rotary nut.

2. The chuck device as claimed in claim 1, wherein said movement suppressing surface comprises a plurality of recess portions situated at spaced apart intervals around said rolling members.

3. The chuck device as claimed in claim 2, wherein said recess portions comprise holes.

4. The chuck device as claimed in claim 2, wherein said recess portions comprise grooves.

5. The chuck device as claimed in claim 2, wherein said recess portions comprise corrugations.

6. The chuck device as claimed in claim 2, wherein said recess portions comprise one of grooves and corrugations extending in a thrust direction of the rotary nut and disposed in parallel with respect to each other.

7. The chuck device as claimed in claim 1, wherein the receiving portion has an elasticity.

8. The chuck device as claimed in claim 1, wherein at least one of steel balls, ceramic balls and plastic balls are used as the rolling members.

9. The chuck device as claimed in claim 1, wherein the annular member is formed integrally with the rotary nut.

* * * * *

UNITED STATES PATENT AND TRADEMARK OFFICE
CERTIFICATE OF CORRECTION

PATENT NO.    : 6,217,033
DATED         : April 17, 2001
INVENTOR(S)   : Kazuo Sakamaki, Akira Sakamaki, Choukichi Sato Page 1 of 1

It is certified that error appears in the above-identified patent and that said Letters Patent is hereby corrected as shown below:

<u>Title page,</u>
Item [73], Assignee: Yukiwa Seiko Kabushiki Kaisha, Niigata-Ken (JP)

Signed and Sealed this

Twenty-sixth Day of February, 2002

*Attest:*

*Attesting Officer*

JAMES E. ROGAN
*Director of the United States Patent and Trademark Office*